(12) United States Patent
Peterson

(10) Patent No.: US 6,614,443 B1
(45) Date of Patent: Sep. 2, 2003

(54) METHOD AND SYSTEM FOR ADDRESSING GRAPHICS DATA FOR EFFICIENT DATA ACCESS

(75) Inventor: James R. Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/515,246

(22) Filed: Feb. 29, 2000

(51) Int. Cl.$^7$ .................. G06F 12/10; G06T 11/40
(52) U.S. Cl. ............... 345/569; 345/572; 345/582; 345/552
(58) Field of Search ................. 345/569, 552, 345/582, 544, 564, 530, 501, 572

(56) References Cited

U.S. PATENT DOCUMENTS 5,495,563 A * 2/1996 Winser ............... 345/582
5,726,689 A * 3/1998 Negishi et al. ......... 345/582
6,104,415 A * 8/2000 Gossett .............. 345/552

* cited by examiner

Primary Examiner—Kee M. Tung
(74) Attorney, Agent, or Firm—Dorsey & Whitney LLP

(57) ABSTRACT

A method and apparatus for mapping graphics data of a texture map into virtual two-dimensional (2D) memory arrays implemented in a one-dimensional memory space. The texture map is partitioned into $2^{u+v}$ two-dimensional arrays having dimensions of $2^m$ bytes×$2^n$ rows. The graphics data is then mapped from a respective two-dimensional array into the one-dimensional memory space by calculating an offset value based on the coordinates of a respective texel of the texture map and subsequently reordering the offset value to produce a memory address value. The order of the offset value is, from least to most significant bits, a first group of m bits, a second group of u bits, a third group of n bits, and a fourth group of v bits. The order of the offset value is reordered to, from least to most significant bits, first, third, second, and fourth groups. The resulting value produces a memory address for the one-dimensional memory space.

93 Claims, 5 Drawing Sheets

METHOD AND SYSTEM FOR ADDRESSING GRAPHICS DATA FOR EFFICIENT DATA ACCESS

TECHNICAL FIELD

The present invention is related generally to the field of computer graphics, and more particularly, to addressing graphics data, such as texture data, in a computer graphics processing system.

BACKGROUND OF THE INVENTION

A graphics accelerator is a specialized graphics processing subsystem for a computer system that relieves a host processor from performing all the graphics processing involved in rendering a graphics image on a display device. The host processor of the computer system executes an application program that generates geometry information used to define graphics elements on the display device. The graphics elements that are displayed are typically modeled from polygon graphics primitives. For example, a triangle is a commonly used polygon for rendering three dimensional objects on the display device. Setup calculations are initially performed by the host processor to define the triangle primitives. The application program then transfers the geometry information from the processor to the graphics processing system so that the triangles may be modified by adding shading, hazing, or other features before being displayed. The graphics processing system, as opposed to the processor, has the task of rendering the corresponding graphics elements on the display device to allow the processor to handle other system requests.

Some polygon graphics primitives also include specifications to map texture data, representative of graphic images, within the polygons. Texture mapping refers to techniques for adding surface detail, or a texture map, to areas or surfaces of the polygons displayed on the display device. A typical texture map is represented in a computer memory as a bitmap or other raster-based encoded format, and includes point elements, or "texels," which reside in a (s, t) texture coordinate space. The graphics data representing the texels of a texture map are stored in a memory of the computer system and used to generate the color values of point elements, or "pixels" of the display device which reside in an (x, y) display coordinate space. As illustrated in FIG. 1, the memory in which the texture data is stored is typically implemented using a one-dimensional memory space partitioned into several memory pages. The memory is allocated by addressing the texture data in a sequential fashion. That is, the resulting physical memory address for the texture data of a particular texel is an offset value that corresponds to the first byte of the texture data for the particular texel.

Generally, the process of texture mapping occurs by accessing the texels from the memory that stores the texture data, and transferring the texture data to predetermined points of the graphics primitive being texture mapped. The (s, t) coordinates for the individual texels are calculated and then converted to physical memory addresses. The texture map data are read out of memory and applied within the respective polygon in particular fashions depending on the placement and perspective of their associated polygon. The process of texture mapping operates by applying color or visual attributes of texels of the (s, t) texture map to corresponding pixels of the graphics primitive on the display. Thus, color values for pixels in (x, y) display coordinate space are determined based on sampled texture map values. Where the original graphics primitives are three dimensional, texture mapping often involves maintaining certain perspective attributes with respect to the surface detail added to the graphics primitive. After texture mapping, a version of the texture image is visible on surfaces of the graphics primitive with the proper perspective.

The color value for a pixel is usually determined by using a method of bilinear filtering. In bilinear filtering, the color values of the four texels closest to the respective location of the pixel are weighted and a resulting color value for the pixel is interpolated therefrom. For example, illustrated in FIG. 1 is a portion of four rows of texels from a texture map 10. The color value for pixel $P_{a,a}$ is determined from the color value of texels $C_{0,0}$, $C_{0,1}$, $C_{1,0}$, and $C_{1,1}$. Similarly, the color value for pixel $P_{b,b}$ is determined from the color value of texels $C_{0,1}$, $C_{0,2}$, $C_{1,1}$, and $C_{1,2}$.

As illustrated by FIG. 1, using bilinear filtering to determine the color value of pixels in an (x, y) display coordinate space requires texture data from two different rows of texels. Where a memory paging scheme is employed for the memory in which the texture data is stored, it is often the case that the memory pages are large enough to contain data for only one row of the texture map. Consequently, when retrieving the texture data to calculate the color of a pixel, an average of two page misses will occur because two different memory pages must be accessed to retrieve the required texture data. Page misses result in inefficient data access of the texture data.

A conventional approach to the problem of multiple page misses is dividing the memory space in which the texture data is stored into several two-dimensional (2D) segments. As illustrated in FIG. 2, although the width of the texture map is divided into several 2D segments, the texture data for texels of several adjacent rows may be stored on a common memory page. Thus, the number of page misses occurring during texture application is reduced. However, allocating memory in a 2D manner is difficult to accomplish, and results in inefficient use of available memory. For example, memory fragmentation issues are exacerbated when attempting to allocate memory in 2D segments. Furthermore, it is generally difficult to find memory allocation algorithms that can optimally allocate memory in 2D manner.

Therefore, there is a need for a system and method for allocating memory in a one-dimensional memory space that results in fewer page misses than conventional approaches.

SUMMARY OF THE INVENTION

A method and apparatus for mapping graphics data of a texture map into virtual two-dimensional (2D) memory arrays implemented in a one-dimensional memory space. The texture map is partitioned into $2^{u+v}$ two-dimensional arrays where each of the arrays has a dimension of $2^m$ bytes×$2^n$ rows, and the graphics data is then mapped from a respective two-dimensional array into the one-dimensional memory space. Mapping occurs by calculating an offset value based on the coordinates of a respective texel of the texture map. The offset value is represented by a first group of m bits, a second group of u bits, a third group of n bits, and a fourth group of v bits, arranged so that the first group represents the least significant bits and the fourth group represents the most significant bits. The arrangement of the groups of the offset value are then reordered to produce a respective memory address for the one-dimensional memory space. The order of the groups for the respective memory address is first, third, second, and fourth groups, from least to most significant bits.

DETAILED DESCRIPTION OF THE INVENTION

Figure 1:
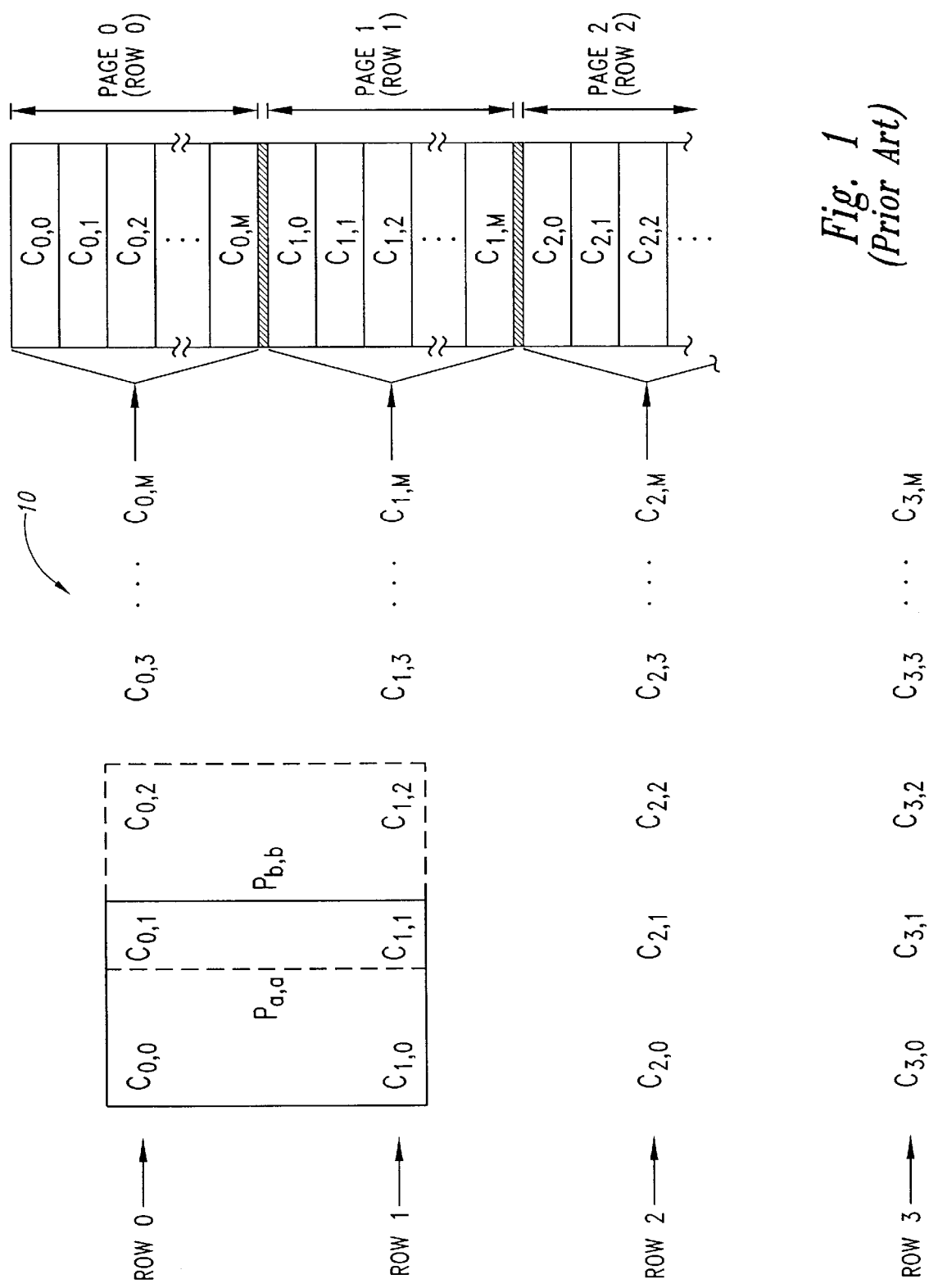
FIG. 1 is a block diagram illustrating a portion of a texture map and a memory space allocated in a conventional one-dimensional manner.
Figure 2:
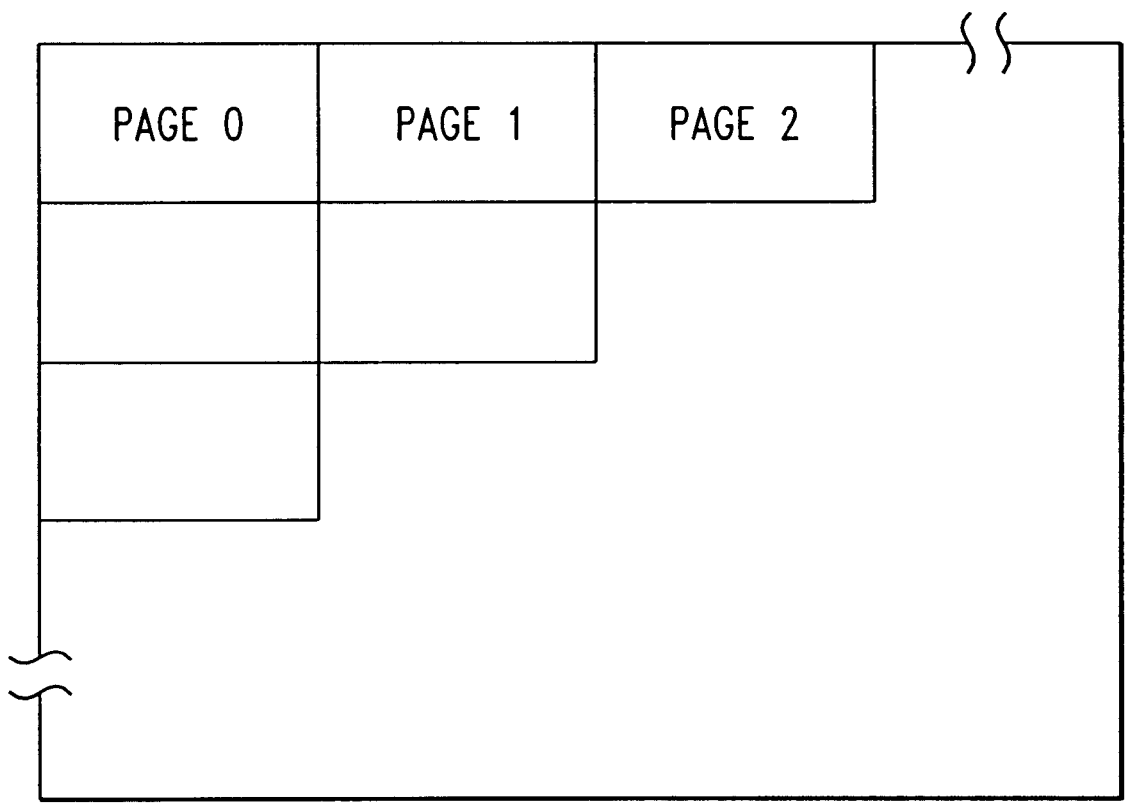
FIG. 2 is a block diagram of a memory space allocated in a conventional two-dimensional manner.
Figure 3:
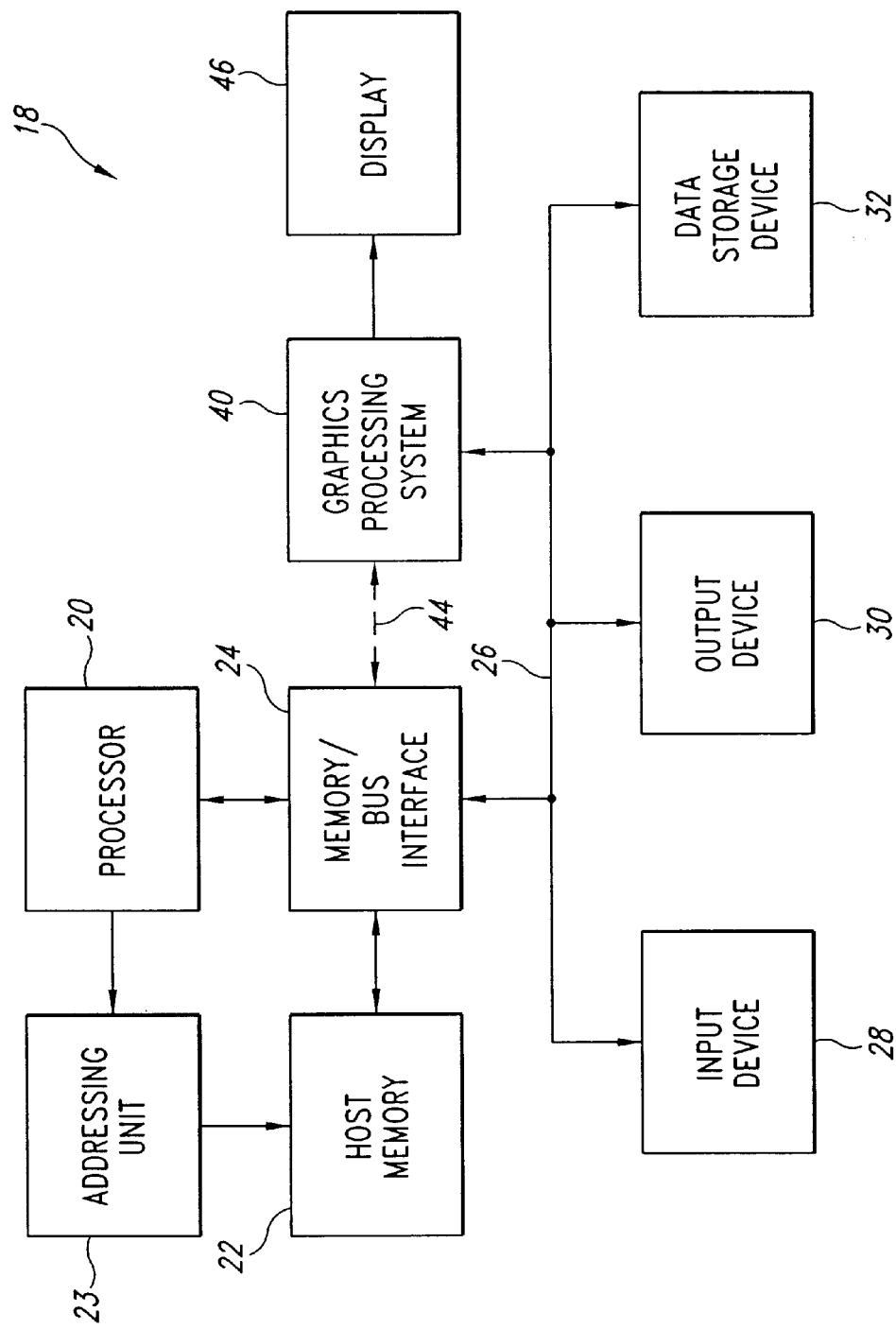
FIG. 3 is a block diagram of a computer system in which embodiments of the present invention are implemented.

Embodiments of the present invention map texels from a texture map coordinate space into virtual two-dimensional (2D) memory arrays implemented in a one-dimensional memory space. Where texels of two different rows of the texture map are required for bilinear filtering, the arrangement of the texels in the virtual 2D memory arrays facilitates texel data processing and minimizes the occurrences of page misses, as encountered with conventional addressing schemes. FIG. 3 illustrates a computer system 18 in which embodiments of the present invention are implemented. The computer system 18 includes a processor 20 coupled to a host memory 22 through an addressing unit 23 that translates texture map coordinates into physical memory addresses, and a through memory/bus interface 24. A memory paging scheme is implemented in the host memory 22 by partitioning the memory space into memory pages. The memory/bus interface 24 is coupled to an expansion bus 26, such as an industry standard architecture (ISA) bus or a peripheral component interconnect (PCI) bus.

The computer system 18 also includes one or more input devices 28, such as a keypad or a mouse, coupled to the processor 20 through the expansion bus 26 and the memory/bus interface 24. The input devices 28 allow an operator or an electronic device to input data to the computer system 18. One or more output devices 30 are coupled to the processor 20 to provide output data generated by the processor 20. The output devices 30 are coupled to the processor 20 through the expansion bus 26 and memory/bus interface 24. Examples of output devices 30 include printers and a sound card driving audio speakers. One or more data storage devices 32 are coupled to the processor 20 through the memory/bus bridge interface 24, and the expansion bus 26 to store data in or retrieve data from storage media (not shown). Examples of storage devices 32 and storage media include fixed disk drives, floppy disk drives, tape cassettes and compact-disk read-only memory drives.

The computer system 18 further includes a graphics processing system 40 coupled to the processor 20 through the expansion bus 26 and memory/bus interface 24. Optionally, the graphics processing system 40 may be coupled to the processor 20 and the host memory 22 through other architectures. For example, the graphics processing system 40 may be coupled through the memory/bus interface 24 and a high speed bus 44, such as an accelerated graphics port (AGP), to provide the graphics processing system 40 with direct memory access (DMA) to the host memory 22. That is, the high speed bus 44 and memory bus interface 24 allow the graphics processing system 40 to read and write host memory 22 without the intervention of the processor 20. Thus, data may be transferred to, and from, the host memory 22 at transfer rates much greater than over the expansion bus 26. A display 46 is coupled to the graphics processing system 40 to display graphics images. The display 46 may be any type, such as a cathode ray tube (CRT), a field emission display (FED), a liquid crystal display (LCD), or the like, which are commonly used for desktop computers, portable computers, and workstation or server applications.

Figure 4:
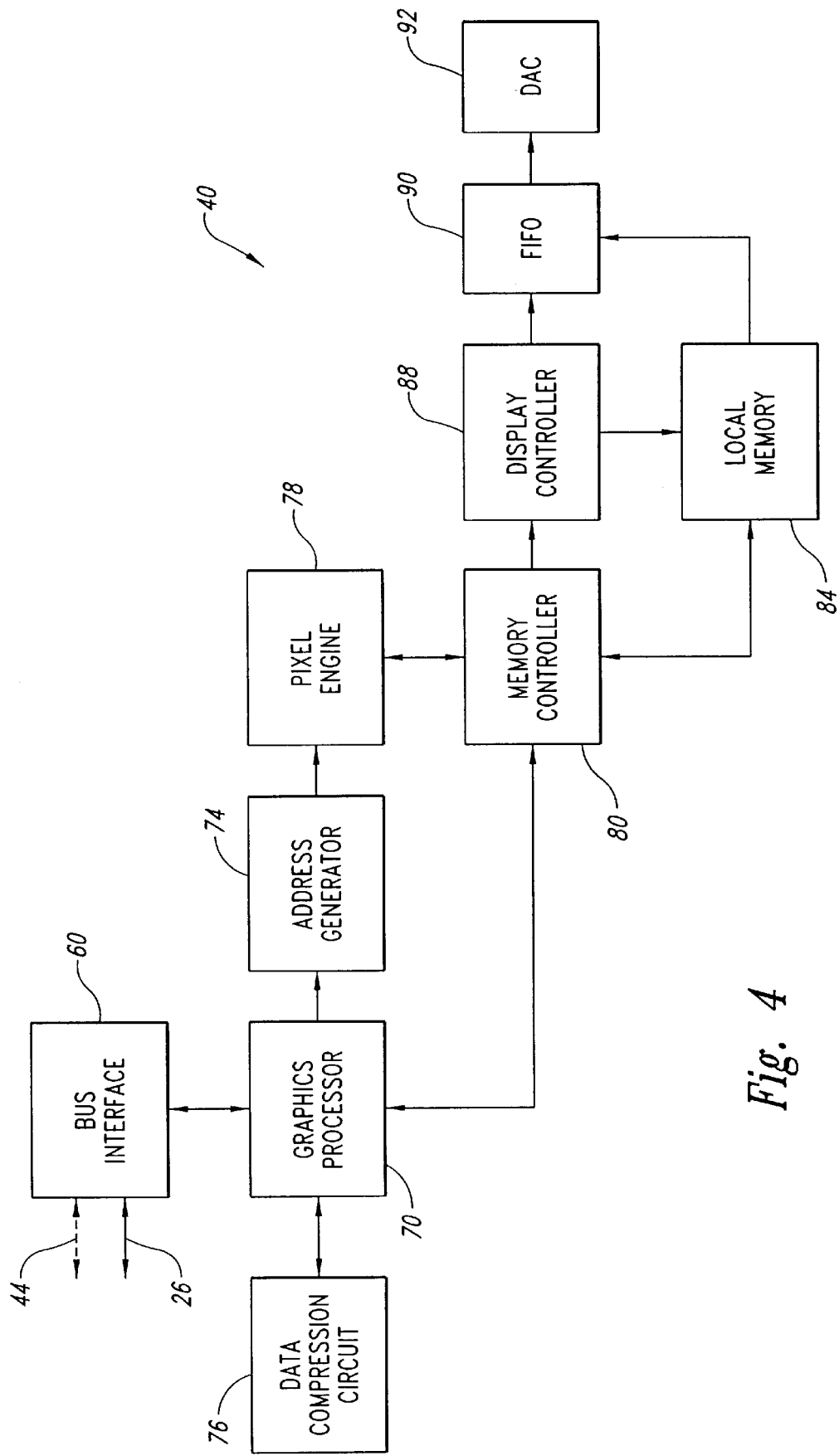
FIG. 4 is a block diagram of a graphics processing system in the computer system of FIG. 3.

FIG. 4 illustrates circuitry included within the graphics processing system 40, including circuitry for performing various three-dimensional (3D) graphics finctions. As shown in FIG. 4, a bus interface 60 couples the graphics processing system 40 to the expansion bus 26. Where the graphics processing system 40 is coupled to the processor 20 and the host memory 22 through the high speed data bus 44 and the memory/bus interface 24, the bus interface 60 will include a DMA controller (not shown) to coordinate transfer of data to and from the host memory 22 and the processor 20. A graphics processor 70 is coupled to the bus interface 60 and is designed to perform various graphics and video processing finctions, such as, but not limited to, generating vertex data and performing vertex transformations for polygon graphics primitives that are used to model 3D objects. In a preferred embodiment, the graphics processor 70 is a reduced instruction set computing (RISC) processor. The graphics processor 70 further includes circuitry for performing various graphics functions, such as clipping, attribute transformations, rendering of graphics primitives, and generating texture coordinates from a texture map. An address generator 74 receives the texture map coordinates from the graphics processor 70, and translates them into the memory addresses where the texture data for the texels are stored. The memory addresses are provided to a pixel engine 78. The pixel engine 78 contains circuitry for performing various graphics functions, such as, but not limited to, texture application or mapping, bilinear filtering, fog, blending, and color space conversion.

A memory controller 80 coupled to the pixel engine 78 and the graphics processor 70 handles memory requests to and from the host memory 22, and a local memory 84. The local memory 84 stores both source pixel color values and destination pixel color values. Destination color values are stored in a frame buffer (not shown) within the local memory 84. In a preferred embodiment, the local memory 84 is implemented using random access memory (RAM), such as dynamic random access memory (DRAM), or static random access memory (SRAM). A display controller 88 coupled to the local memory 84 and to a first-in first-out (FIFO) buffer 90 controls the transfer of destination color values stored in the frame buffer to the FIFO 90. Destination values stored in the FIFO 90 are provided to a digital-to-analog converter (DAC) 92, which outputs red, green, and blue analog color signals to the display 46 (FIG. 3).

In operation, a graphics application executing on the processor 20 (FIG. 3) writes graphics data, such as a texture map, from the data storage device 32 to the host memory 22 or the local memory 84 in preparation for texture application by the pixel engine 78. As will be explained in greater detail below, texture data of the texture map is written into virtual 2D memory arrays that are implemented in the host memory 22 and the local memory 84. Calculation of a physical memory address that arranges the texture data into the virtual 2D memory arrays is accomplished by the addressing unit 23. An offset value is calculated for each texel based on its respective texture coordinate (s, t), and is subsequently reordered into a format that produces the physical memory address that maps the texture data into a virtual 2D arrays. As a result, a one-dimensional memory space may be used for the host memory 22 and the local memory 84.

When texture application begins, the graphics application executing on the processor 20 communicates with the graphics processor 70, and provides it with information that will be used by the graphics processor 70 to determine the coordinates of the texels needed for texture application. These texture coordinates are provided to the address generator 74 for translation into the memory addresses of the requested texels. The address generator 74 determines the memory address of the requested texels in a manner similar to that used by the addressing unit 23 when writing the texture data into the host memory 22 or the local memory 84. That is, an offset value is calculated for each texel based on its texture map coordinates, and the format of the resulting offset values are reordered to produce the physical memory address at which the texture data is stored.

The memory addresses generated by the address generator 74 are then provided to the pixel engine 78. The pixel engine 78 uses the physical memory addresses to request the texture data from either the host memory 22 or the local memory 84. The requested texture data is eventually provided to the pixel engine 78 for texture application.

As mentioned previously, the process of translating the texture coordinates into a memory address that maps the corresponding texture data into virtual 2D memory arrays is accomplished by calculating an offset value for a requested texel and then reordering the resulting offset value to produce a physical memory address. The offset value for a texel is based on its texture coordinates (s, t) and the size of the texture map. The offset value for a texel in a texture map having two coordinate axes (s, t) is calculated from the following equation:

offset value=($s$×bytes/texel)+($t$×bytes/stride).

The stride is the width of a texture map in bytes. A typical texture map is 256×256 texels. Assuming a 32-bit texture, that is, 4 bytes/texel, the resulting stride is 1,024 bytes. For a 16-bit texture, which has 2 bytes/texel, the resulting stride is 512 bytes. The resulting offset value is essentially a byte index value for a particular texel in a texture map. In the case where more than one texture map is stored in memory concurrently, a base value is added to the offset value in order to index the correct texture map.

The bits of the calculated offset value are reordered to produce a physical memory address that maps the texels of a texture map into virtual 2D memory arrays. That is, the reordered offset value produces a physical address for a one dimensional memory space, but the resulting physical address positions the texels in the memory at a location that is, relatively speaking, similar to being arranged in a 2D memory array.

A 256×256 texture map having 32-bit textures will be used for purposes of describing embodiments of the present example. Each texel is represented by 32-bits, or 4 bytes/texel. Consequently, the stride of the texture map is 1,024 bytes, or 1 kB. The size of the total texture map is 1,024 bytes/row×256 rows, or 256 kB. The offset value for the described texture map is:

offset value=($s$×4 bytes/texel)+($t$×1,024 bytes/stride)

For purposes of the present example, the offset values will be represented by 20-bit numbers. However, it will be appreciated that using offset values of different lengths will remain within the scope of the present invention. The notation used to describe the 20 bits of the offset value is "bits[19:0]." The least significant bit, or the LSB, is the right-most bit.

In one embodiment of the present invention, the bits of the offset values for the texels of a texture map having a 1 kB stride are reordered to map the texture data into virtual 2D memory arrays of 16 bytes×32 rows. For the 256 kB texture map described above, each of the virtual 2D memory arrays contain texture data for 4 texels/row×32 rows, or 128 texels. Thus, 64×8, or 512, virtual 2D memory arrays of 256 kB are required to represent the complete 256×256 texture map.

To map the texture map into these arrays, the bits of the offset value, that is, bits [19:0], are reordered into the following format to provide a physical memory address:

virtual 2D address=bits[19:15]; bits[9:4]; bits[14:10]; bits[3:0]

Bits[3:0] represent the 16 byte width, and bits[14:10] represent the 32 rows of each of the virtual 2D arrays. Bits[9:4] represent the sixty-four 2D arrays required to cover the 1,024 byte stride and bits[17:15] represent the 8 rows of 2D arrays to make up the 256×256 texture map. The resulting reordered offset value can be used as a physical memory address that maps the texture map into virtual 2D memory arrays. Consequently, a one-dimensional memory space may be used. As mentioned previously, a memory paging scheme is implemented in the memories, and are consequently partitioned into memory pages. The resulting physical memory addresses organize the texel data into a 2D arrays to reduce the number of page misses that occur when bilinear filtering is applied.

Figure 5:
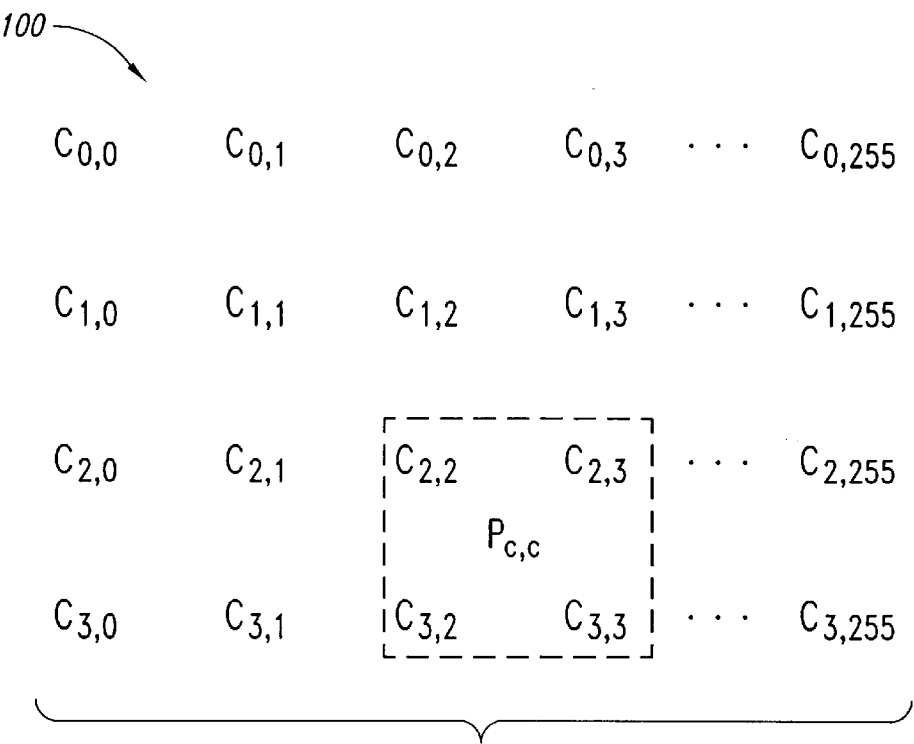
FIG. 5 illustrates a portion of a texture map.

Illustrated in FIG. 5 is a portion of a texture map 100 having the stride and bytes/texel as described above. That is, the texture map 100 is 256×256 texel and has 32-bit textures. Thus, the resulting stride is 1 kB. Assuming that the memories are partitioned into 1 kB memory pages, only one row of the 256×256 texture map would be stored per memory page using a conventional addressing method. and $C_3$ will be necessary to calculate the color value for the pixel $P_{C,C}$. The offset values for each of the texels will be calculated below, and the bits of the resulting value will be reordered into the format previously described. Only 16 bits of each offset value are illustrated in the example below. The bits [19:16], which would be zero for the texels $C_{2,2}$, $C_{2,3}$, $C_{3,2}$, and $C_{3,3}$, have been omitted to minimize complexity of the explanation. The offset values for the texels defined by $C_{2,2}$, $C_{2,3}$, $C_{3,2}$ and $C_{3,3}$ are as follows:

$C_{2,2}$ offset = (2 × 4 bytes/texel) + (2 × 1,024 bytes/row) = 2,056 = 0000 1000 0000 1000
reordered $C_{2,2}$ offset = 0000 0000 0010 1000 = 40
$C_{2,3}$ offset = (3 × 4 bytes/texel) + (2 × 1,024 bytes/row) = 2,060 = 0000 1000 0000 1100
reordered $C_{2,3}$ offset = 0000 0000 0010 1100 = 44
$C_{3,2}$ offset = (2 × 4 bytes/texel) + (3 × 1,024 bytes/row) = 3,080 = 0000 1100 0000 1000
reordered $C_{3,2}$ offset = 0000 0000 0011 1000 = 56
$C_{3,3}$ offset = (3 × 4 bytes/texel) + (3 × 1,024 bytes/row) = 3,084 = 0000 1100 0000 1100
reordered $C_{3,3}$ offset = 0000 0000 0011 1100 = 60

Figure 6:
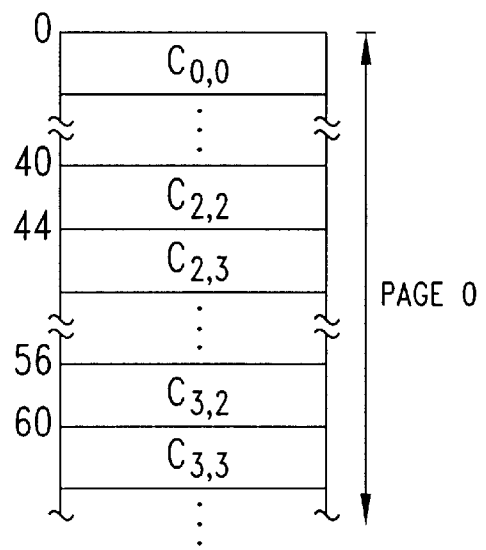
FIG. 6 is a block diagram of a memory space allocated according to an embodiment of the present invention.

As shown by the example above, if the offset values for each of the texels were used as the physical memory addresses, texels $C_{2,2}$ and $C_{2,3}$ and texels $C_{3,2}$ and $C_{3,3}$ would be in two different 1 kB memory pages. As a result, two page misses would occur when obtaining the texel data to. calculate the color value of the pixel $P_{C,C}$. However, using the reordered offset values as the physical memory addresses places all four texels in the same 1 kB memory page. As illustrated in FIG. 6, the texture data for texel $C_{2,2}$ is stored at memory address 40, for texel $C_{2,3}$ at memory address 44, for texel $C_{3,2}$ at memory address 56, and for texel $C_{3,3}$ at memory address 60. Consequently, the texture data for these four texels may be stored in one 1 kB memory page, and no page misses will occur when obtaining the color values for the texels $C_{2,2}$, $C_{2,3}$, $C_{3,2}$, and $C_{3,3}$.

Although 16 byte×32 row virtual 2D arrays are described above, larger or smaller 2D arrays may be also implemented by reordering the bits of the offset value in a manner similar to that explained above. For example, if 32 byte×32 row virtual 2D arrays are desired, a possible format for the reordered offset value is:

virtual 2D address=bits[19:15]; bits[9:5]; bits [14:10]; bits[4:0]

The 32 byte width is represented by bits [4:0] and the 32 row depth is represented by bits [10:14]. Some considerations for selecting the size of the 2D array are the number of bytes representing each texel, the size of each memory page, and the size of the texture map. Thus, it will be appreciated that the specific values used above are provided by way of example, and that different values may be used and still remain within the scope of the present invention.

Similarly, some or all of the principles of the present invention may be used for larger or smaller texture maps than that previously described. That is, the format of the reordered offset value may change depending on the stride of the texture map. For example, the following are suggested formats for reordering the offset values as a function of the stride of the texture map:

| Stride | Reordered offset format |
| --- | --- |
| 128 bytes | bits[19:12]; bits [6:4]; bits [11:7]; bits[3:0] |
| 256 bytes | bits[19:13]; bits [7:4]; bits [12:8]; bits[3:0] |
| 512 bytes | bits[19:14]; bits [8:4]; bits [13:9]; bits[3:0] |
| 1,024 bytes | bits[19:15]; bits [9:4]; bits [14:10]; bits[3:0] |
| 2,048 bytes | bits[19:16]; bits [10:4]; bits [15:11]; bits[3:0] |
| 4,096 bytes | bits[19:17]; bits [11:4]; bits [16:12]; bits[3:0] |
| 8,192 bytes | bits[19:18]; bits [12:4]; bits [17:13]; bits[3:0] |

The virtual 2D arrays of the formats provided above use 16 byte×32 row arrays, as illustrated by the first and second groups of bits from the right-hand side of the format.

The third group of bits represents the number of arrays across the width of the stride. For example, for a texture map having a 4,096 stride, there are 256 (i.e., bits [11:4] provide 8 bits, $2^8=256$) virtual 2D memory arrays across the stride of the texture map. The fourth group of bits represents the number of rows of the virtual 2D arrays. For example, where the texture map has a 4,096 stride, the number of bits greater than the seventeenth bit define the number of rows of virtual 2D arrays of 16 byte×32 rows are present. The reordered offset format provided above are merely examples of possible formats. It will be appreciated, that other formats may also be used to map the texture data into a virtual 2D array.

From the foregoing it will be appreciated that, although specific embodiments of the invention have been described herein for purposes of illustration, various modifications may be made without deviating from the spirit and scope of the invention. For example, the embodiments of the present invention have been described with respect to two-dimensional texture maps where the texels have (s, t) coordinates. However, some or all of the principles of the present invention may be applied to three-dimensional texture maps as well. Accordingly, the invention is not limited except as by the appended claims.

I claim:

1. A method of determining an address for graphics data of texels arranged according to a coordinate system having at least first and second coordinates, the method comprising:
   calculating a first value from the first and second coordinates of a respective texel, the first value represented by characters arranged in a first format; and
   arranging the characters of the first value into a memory address format determined from a stride of the graphics data, the graphics memory m bytes in length and the first value=(first coordinate×m)+(second coordinate×the stride of the graphics data)+a base address.

2. The method according to claim 1 wherein m=4.

3. The method according to claim 1 wherein the stride of the graphics data is 128 bytes, and the memory address format into which the first value is arranged comprises: characters[23:12], characters[6:4], characters[11:7], characters[3:0].

4. The method according to claim 1 wherein the stride of the graphics data is 256 bytes, and the memory address format into which the first value is arranged comprises: characters[23:13], characters[7:4], characters[12:8], characters[3:0].

5. The method according to claim 1 wherein the stride of the graphics data is 512 bytes, and the memory address format into which the first value is arranged comprises: characters[23:14], characters[8:4], characters[13:9], characters[3:0].

6. The method according to claim 1 wherein the stride of the graphics data is 1024 bytes, and the memory address format into which the first value is arranged comprises: characters[23:15], characters[9:4], characters[14:10], characters[3:0].

7. The method according to claim 1 wherein the stride of the graphics data is 2048 bytes, and the memory address format into which the first value is arranged comprises: characters[23:16], characters[10:4], characters[15:11], characters[3:0].

8. The method according to claim 1 wherein the stride of the graphics data is 4096 bytes, and the memory address format into which the first value is arranged comprises: characters[23:17], characters[11:4], characters[16:12], characters[3:0].

9. The method according to claim 1 wherein the stride of the graphics data is 8192 bytes, and the memory address format into which the first value is arranged comprises: characters[23:18], characters[12:4], characters[17:13], characters[3:0].

10. A method of addressing graphics data of texels arranged in a first coordinate space, the method comprising:
   partitioning the graphics data of the texels into $2^{u+v}$ two-dimensional arrays, each array having dimensions of $2^m$ bytes×$2^n$ rows;
   calculating a first value based on coordinates of a respective texel in the first coordinate space, the first value represented by a first group of m bits, a second group of u bits, a third group of n bits, and a fourth group of v bits, arranged so that the first group represents the least significant bits and the fourth group represents the most significant bits; and
   reordering the groups of the first value to produce a respective memory address, the order of the groups for the respective memory address is first, third, second, and fourth groups, from least to most significant bit.

11. The method of claim 13 wherein each texel is represented by Q bytes and the first value=(a first coordinate×Q)+(a second coordinate×$2^{u+m}$)+a base address.

12. The method of claim 11 wherein Q=4.

13. The method of claim 11 wherein Q+2.

14. The method of claim 10 wherein (v+u+n+m)=24.

15. The method of claim 14 wherein m=4 and n=5.

16. The method of claim 15 wherein u=3 and v=12.

17. The method of claim 15 wherein u=4 and v=11.

18. The method of claim 15 wherein u=5 and v=10.

19. The method of claim 15 wherein u=6 and v=9.

20. The method of claim 15 wherein u=7 and v=8.

21. The method of claim 15 wherein v=8 and v=7.

22. The method of claim 15 wherein v=9 and v=6.

23. A method of addressing graphics data of texels arranged in a first coordinate space, the graphics data used for calculating color values of pixels and stored in a memory partitioned into memory pages, the method comprising:

calculating a first value based on coordinates of a respective texel in the first coordinate space, the first value represented by a first group of m bits, a second group of u bits, a third group of n bits, and a fourth group of v bits, arranged so that the first group represents the least significant bits and the fourth group represents the most significant bits; and reordering the groups of the first value into a memory address having the groups arranged in an order of first, third, second, and fourth groups, from least to most significant bit, to store graphics data that would be on separate memory pages according to the first coordinate space into an arrangement in the memory where the graphics data used to calculate a color value of a pixel on the same memory page.

24. The method of claim 23 wherein each texel is represented by Q bytes and the first value (a first coordinate×Q)+(a second coordinate×$2^{u+m}$)+a base address.

25. The method of claim 24 wherein Q=4.

26. The method of claim 24 wherein Q=2.

27. The method of claim 23 wherein (v+u+n+m)=24.

28. The method of claim 27 wherein m=4 and n=5.

29. The method of claim 28 wherein u=3 and v=12.

30. The method of claim 28 wherein u=4 and v=11.

31. The method of claim 28 wherein u=5 and v=10.

32. The method of claim 28 wherein u=6 and v=9.

33. The method of claim 28 wherein u=7 and v=8.

34. The method of claim 28 wherein v=8 and v=7.

35. The method of claim 28 wherein v=9 and v=6.

36. The method of claim 23 wherein each texel has a first and second coordinate in the first coordinate space, and reordering the first value comprises:

calculating a first value from the first and second coordinates of a respective texel, the first value represented by characters arranged in a first format; and arranging the characters of the first value into a memory address format determined from a stride of the graphics data.

37. The method according to claim 36 wherein the graphics memory are m bytes in length.

38. The method according to claim 37 wherein the first value =(first coordinate×m)+(second coordinate×the stride of the graphics data) +a base address.

39. The method according to claim 37 wherein m=4.

40. An apparatus for addressing graphics data of texels arranged in a first coordinate space, each texel represented by Q bytes of graphics data, the apparatus comprising:

an address generator to generate a first value for a respective texel from its coordinates in the first coordinate space, the first value=(a first coordinate×Q)+(a second coordinate×$2^{u+m}$)+a base address; and a mapping circuit coupled to the address generator to partition the graphics data into $2^{u+v}$ two-dimensional arrays and to map the graphics data from the two-dimensional arrays into a one-dimensional memory space, each two-dimensional array having dimensions of $2_m$bytes×$2^n$ rows.

41. The apparatus of claim 40 wherein Q=4.

42. The apparatus of claim 40 wherein Q=2.

43. The apparatus of claim 40 wherein the mapping circuit is adapted to map the graphics data by reordering the characters of the first value from the first format to a second format to produce a memory address.

44. The apparatus of claim 43 wherein the characters of the first value are bits, the first format comprises bits arranged, from least to most significant, in a first group of m bits, a second group of u bits, a third group of n bits, and a fourth group of v bits, and the second format comprises bits arranged so that the group order is, from least to most significant, the first group, the third group, the second group, and the fourth group.

45. The apparatus of claim 44 wherein (v+u+n+m)=24.

46. The apparatus of claim 45 wherein m=4 and n=5.

47. The apparatus of claim 46 wherein u=3 and v=12.

48. The apparatus of claim 46 wherein u=4 and v=11.

49. The apparatus of claim 46 wherein u=5 and v=10.

50. The apparatus of claim 46 wherein u=6 and v=9.

51. The apparatus of claim 46 wherein u=7 and v=8.

52. The apparatus of claim 46 wherein v=8 and v=7.

53. The apparatus of claim 46 wherein v=9 and v=6.

54. A computer system, comprising:

a central processing unit (CPU);

a system memory coupled to the CPU to store graphics data of texels arranged in a first coordinate space, each texel represented by Q bytes of graphics data, the system memory having a one-dimensional memory space;

a bus coupled to the CPU;

a graphics processor coupled to the bus to process the graphics data; and an apparatus for addressing the graphics data, comprising:

an address generator to generate a first value for a respective texel from its coordinates in the first coordinate space, the first value=(a first coordinate×Q)+(a second coordinate×$2^{u+m}$) a base address; and a mapping circuit coupled to the address generator to partition the graphics data into $2^{u+v}$ two-dimensional arrays and to map the graphics data from the two-dimensional arrays into the one-dimensional memory space, each two-dimensional array having dimensions of $2^m$ bytes×$2^n$ rows.

55. The computer system of claim 54 wherein Q=4.

56. The computer system of claim 54 wherein Q=2.

57. The computer system of claim 51 wherein the mapping circuit is adapted to map the graphics data by reordering the characters of the first value from the first format to a second format to produce a memory address.

58. The computer system of claim 57 wherein the characters of the first value are bits, the first format comprises bits arranged, from least to most significant, in a first group of m bits, a second group of u bits, a third group of n bits, and a fourth group of v bits, and the second format comprises bits arranged so that the group order is, from least to most significant, the first group, the third group, the second group, and the fourth group.

59. The computer system of claim 58 wherein (v+u+n+m)=24.

60. The computer system of claim 59 wherein m=4 and n=5.

61. The computer system of claim 60 wherein u=3 and v=12.

62. The computer system of claim 60 wherein u=4 and v=11.

63. The computer system of claim 60 wherein u=5 and v 10.

64. The computer system of claim 60 wherein u=6 and v=9.

65. The computer system of claim 60 wherein u=7 and v=8.

66. The computer system of claim 60 wherein v=8 and v=7.

67. The computer system of claim 60 wherein v=9 and v=6.

68. An apparatus for addressing graphics data of texels arranged in a first coordinate space, the apparatus comprising:
- an address generator to generate a first value for a respective texel from its coordinates in the first coordinate space, the first value having a first format; and
- a mapping circuit coupled to the address generator to partition the graphics data into $2^{u+v}$ two-dimensional arrays and to map the graphics data from the two-dimensional arrays into a one-dimensional memory space by reordering bits of the first value from the first format to a second format to produce a memory address, each two-dimensional array having dimensions of $2^m$ bytes×$2^n$ rows, the first format having the bits arranged, from least to most significant, in a first group of m bits, a second group of u bits, a third group of n bits, and a fourth group of v bits, and the second format having the bits arranged so that the group order is, from least to most significant, the first group, the third group, the second group, and the fourth group.

69. The apparatus of claim 68 wherein (v+u+n +m) =24.

70. The apparatus of claim 69 wherein m =4 and n =5.

71. The apparatus of claim 70 wherein u=3 and v=12.

72. The apparatus of claim 70 wherein u=4 and v=11.

73. The apparatus of claim 70 wherein u=5 and v=10.

74. The apparatus of claim 70 wherein u=6 and v=9.

75. The apparatus of claim 70 wherein u=7 and v=8.

76. The apparatus of claim 70 wherein v=8 and v=7.

77. The apparatus of claim 70 wherein v=9 and v=6.

78. The apparatus of claim 68 wherein a texel is represented by Q bytes of graphics data, and the first value =(a first coordinate×Q) +(a second coordinate×$2^{u+m}$) a base address.

79. The apparatus of claim 78 wherein Q=4.

80. The apparatus of claim 78 wherein Q=2.

81. A computer system, comprising:
- a central processing unit (CPU);
- a system memory coupled to the CPU to store graphics data of texels arranged in a first coordinate space, the system memory having a one-dimensional memory space;
- a bus coupled to the CPU;
- a graphics processor coupled to the bus to process the graphics data; and
- an apparatus for addressing the graphics data, comprising:
  - an address generator to generate a first value for a respective texel from its coordinates in the first coordinate space, the first value having a first format; and
  - a mapping circuit coupled to the address generator to partition the graphics data into $2^{u+v}$ two-dimensional arrays and to map the graphics data from the two-dimensional arrays into the one-dimensional memory space by reordering bits of the first value from the first format to a second format to produce a memory address, each two-dimensional array having dimensions of $2^m$ bytes×$2^n$ rows, the first format having the bits arranged, from least to most significant, in a first group of m bits, a second group of u bits, a third group of n bits, and a fourth group of v bits, and the second format having the bits arranged so that the group order is, from least to most significant, the first group, the third group, the second group, and the fourth group.

82. The computer system of claim 81 wherein (v+u+n+m) =24.

83. The computer system of claim 82 wherein m=4 and n=5.

84. The computer system of claim 83 wherein u=3 and v=12.

85. The computer system of claim 83 wherein u=4 and v=11.

86. The computer system of claim 83 wherein u=5 and v=10.

87. The computer system of claim 83 wherein u=6 and v=9.

88. The computer system of claim 83 wherein u=7 and v=8.

89. The computer system of claim 83 wherein v=8 and v 7.

90. The computer system of claim 83 wherein v=9 and v=6.

91. The computer system of claim 81 wherein a texel is represented by Q bytes of graphics data, and the first value (a first coordinate×Q) +(a second coordinate×$2^{u+m}$)+a base address.

92. The computer system of claim 91 wherein Q=4.

93. The computer system of claim 91 wherein Q=2.

* * * * *

UNITED STATES PATENT AND TRADEMARK OFFICE
CERTIFICATE OF CORRECTION

PATENT NO. : 6,614,443 B1
DATED : September 2, 2003
INVENTOR(S) : James R. Peterson It is certified that error appears in the above-identified patent and that said Letters Patent is hereby corrected as shown below:

Column 2,
Line 44, "memory in 2D" should read -- memory in a 2D --

Column 3,
Line 44, "operator or" should read -- operator of --

Column 4,
Line 25, "finctions, such as," should read -- functions, such as, --

Column 5,
Line 4, "a virtual 2D arrays." should read -- a virtual 2D array. --

Column 6,
Line 30, "data into a 2D" should read -- data into 2D --
Line 39, "addressing method. and" should read -- addressing method and --

Column 7,
Line 1, "to. calculate the color" should read -- to calculate the color --
Line 57, "rows are present." should read -- rows that are present. --
Line 59, "be appreciated, that" should read -- be appreciated that --

Column 9,
Line 3, "of claim 13 wherein" should read -- of claim 10 wherein --
Line 7, "wherein Q + 2." should read -- wherein Q = 2. --
Lines 15 and 48, "wherein v=8 and v=7." should read -- wherein u=8 and v=7. --
Lines 16 and 49, "wherein v=9 and v=6." should read -- wherein u=9 and v=6. --
Line 35, "on the same memory page." should read -- are on the same memory page. --
Line 37, "and the first value (a first coordinateXQ)" should read -- and the first value = (a first coordinateXQ) --

Column 10,
Line 10, "of $2_m$bytesX$2^n$ rows." should read -- of $2^m$bytesX$2^n$ rows. --
Line 32, "wherein v=8 and v=7." should read -- wherein u=8 and v=7. --
Line 33, "wherein v=9 and v=6." should read -- wherein u=9 and v=6. --
Line 48, "(a second coordinateX$2^{u+m}$) a base address; and" should read -- (a second coordinateX$2^{u+m}$) + a base address; and --
Line 58, "system of claim 51 wherein" should read -- system of claim 54 wherein --

UNITED STATES PATENT AND TRADEMARK OFFICE
CERTIFICATE OF CORRECTION

PATENT NO. : 6,614,443 B1
DATED : September 2, 2003
INVENTOR(S) : James R. Peterson It is certified that error appears in the above-identified patent and that said Letters Patent is hereby corrected as shown below:

Column 11,
Lines 17-18 and 48, "wherein v=8 and v=7." should read -- wherein u=8 and v=7. --
Lines 19-20 and 49, "wherein v=9 and v=6." should read -- wherein u=9 and v=6. --
Lines 52-53, "+(a second coordinateX2$^{u+m}$) a base address." should read
-- +(a second coordinateX2$^{u+m}$) + a base address. --

Column 12,
Lines 45-46, "wherein v=8 and v=7." should read -- wherein u=8 and v=7. --
Lines 47-48, "wherein v=9 and v=6." should read -- wherein u=9 and v=6. --
Line 50, "and the first value" should read -- and the first value = --

Signed and Sealed this

Thirtieth Day of November, 2004

JON W. DUDAS
*Director of the United States Patent and Trademark Office*